Nov. 3, 1959   G. J. PANCHERI   2,910,833
FISH LADDER
Filed Jan. 21, 1958   2 Sheets-Sheet 1
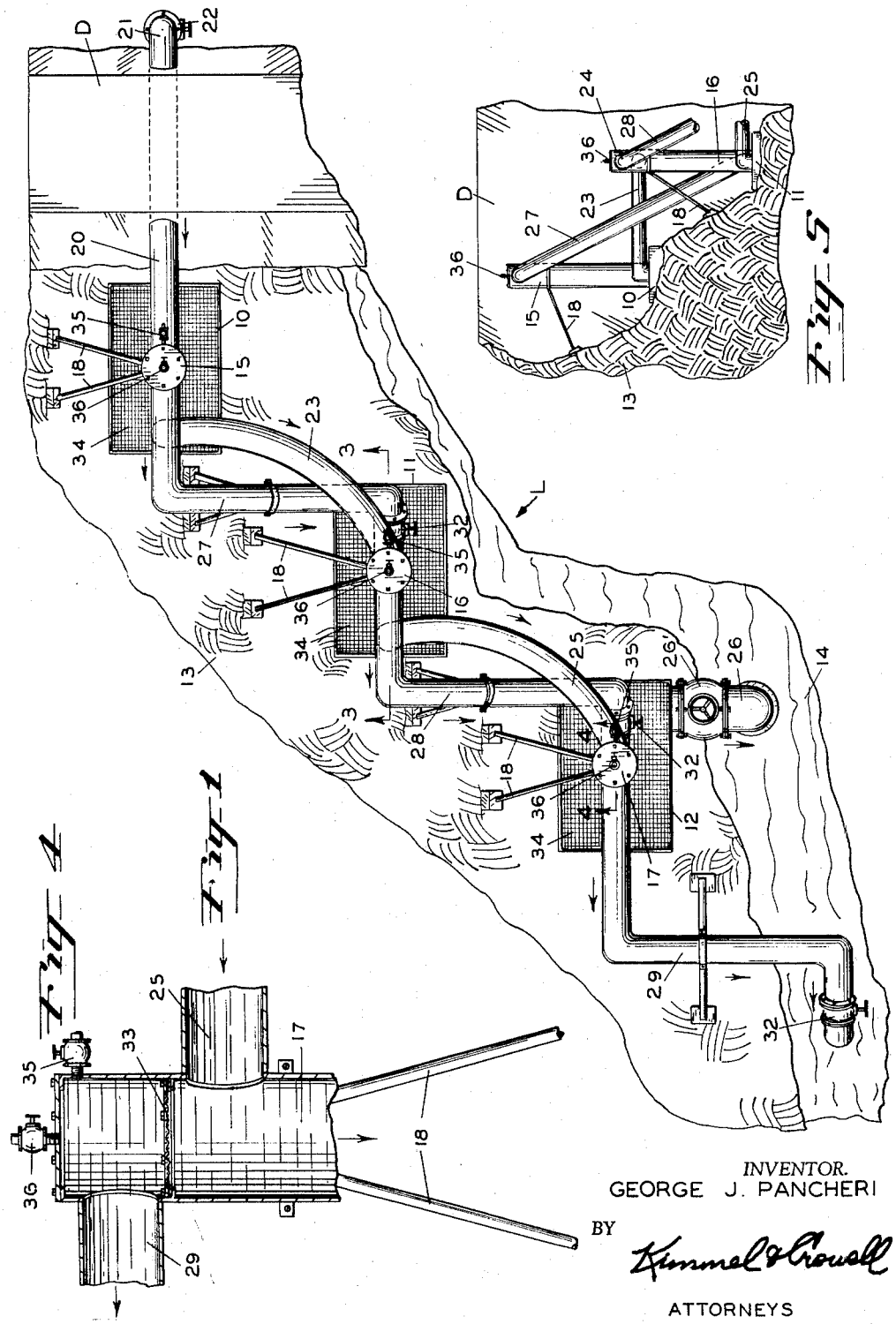
INVENTOR.
GEORGE J. PANCHERI
BY
Kimmel & Crowell
ATTORNEYS Nov. 3, 1959
G. J. PANCHERI
2,910,833
FISH LADDER
Filed Jan. 21, 1958
2 Sheets-Sheet 2
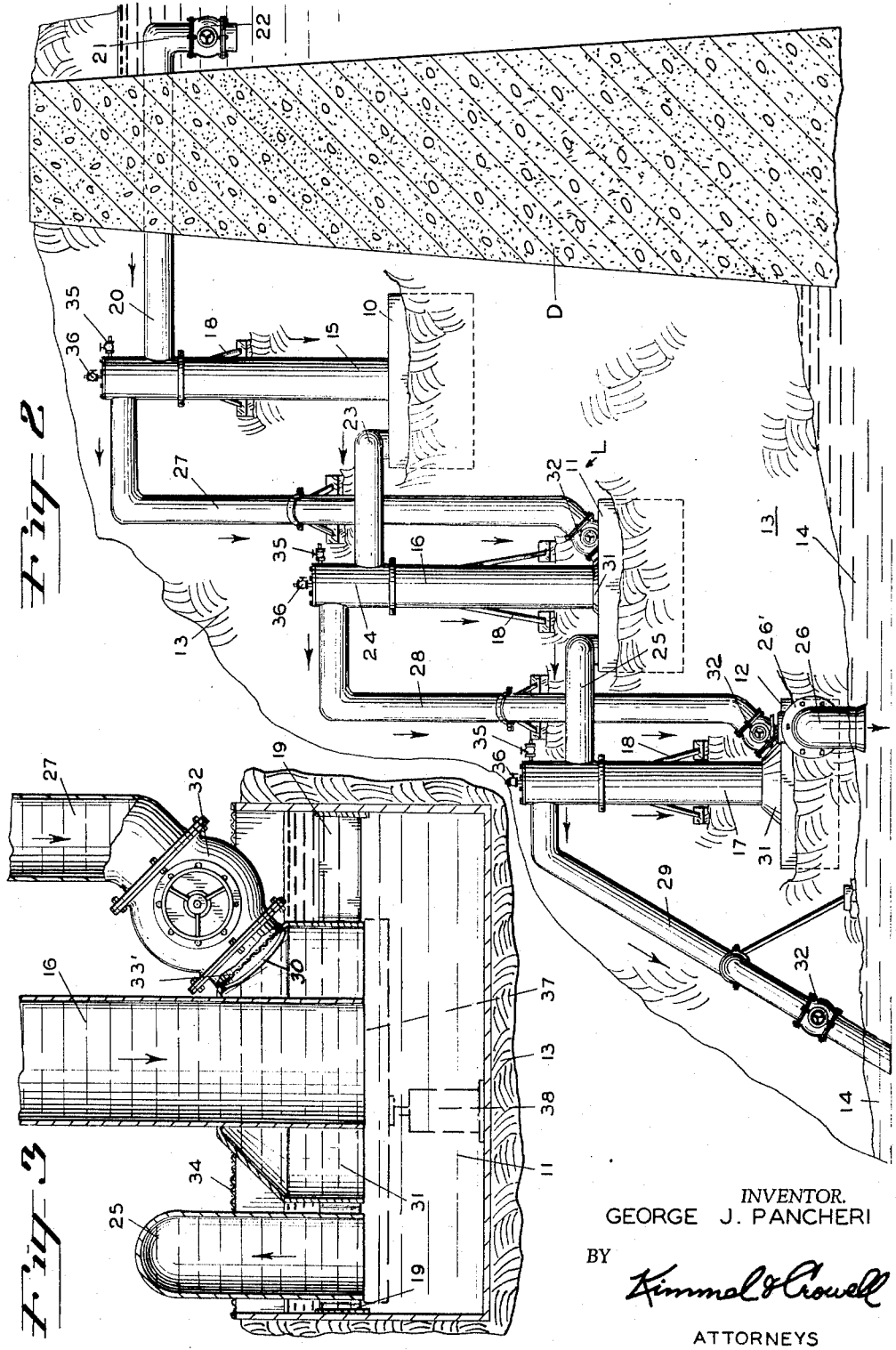
INVENTOR.
GEORGE J. PANCHERI
BY
Kimmel & Crowell
ATTORNEYS

United States Patent Office 2,910,833
Patented Nov. 3, 1959

2,910,833

FISH LADDER

George John Pancheri, Centralia, Wash.

Application January 21, 1958, Serial No. 710,261

3 Claims. (Cl. 61—21)

The invention relates to fish ladders particularly for raising and lowering fish past dams and the like.

The primary object of the invention is to provide a tube in which to raise and lower fish past dams and the like by their own swimming effort. The speed of the water passing through the pipe is controlled by a regulator within a siphon system.

Another object of this invention is to provide a siphon system including a series of steps extending from one level to another. With this new and improved fish ladder, there are no mechanical obstacles against which the fish can be injured in being transferred either up or down, and they adjust themselves under their own power to either go up or down. By using a free flow of water from one level to another, the smaller fish can come downstream without being injured and the larger fish can travel up to the higher levels without any mechanical contact against obstacles that would tend to injure them.

Other objects and advantages will become apparent in the following specification when considered in the light of the attached drawings, in which:

Figure 1 is a plan view of the invention illustrating a fragmentary portion of a dam.

Figure 2 is a side elevation with the dam shown in section.

Figure 3 is an enlarged detail sectional view of one of the receiving tanks, taken on the line 3—3 of Figure 1, looking in the direction of the arrows.

Figure 4 is an enlarged fragmentary sectional view, taken on the line 4—4 of Figure 1, looking in the direction of the arrows.

Figure 5 is a fragmentary end view, looking towards the dam.

Referring now to the drawings in detail wherein like reference numerals indicate like parts throughout the several figures, the reference character D indicates generally a dam with which a fish ladder L, constructed in accordance with the invention, is associated.

The fish ladder L includes a series of receiving tanks 10, 11 and 12 located on the lower side of the dam D on bank 13 of the river 14. A series of vertical fish passageways 15, 16 and 17 are vertically disposed above the tanks 10, 11 and 12 upon supports 18 mounted within the tanks 10, 11 and 12 on brackets 19.

A supply water tube 20 passes through the upper portion of the dam D and has a downwardly offset end portion 21 having a shutoff valve 22 located therein. The tube 20 leads the water from the upper side of the dam D into the passageway 15. Another water containing fish passage 23 leads from the tank 10 into upper end 24 of the fish passageway 16, while a third water containing fish passageway 25 leads from the tank 11 into the upper end of the passageway 17.

A fish entrance and exit pipe 26 leads from the tank 12 into the river 14 on the lower side of the dam D, and has a shutoff valve 26' disposed therein. Pipes 27, 28 and 29 are provided to control the downward flow of the water through the fish passageways 15, 16 and 17 in the following manner. The lower ends 30 of the pipes 27 and 28 enter into discharge manifolds 31 formed on the lower ends of the passageways 16 and 17, while the lower end of the pipe 29 enters into the river 14, and each of the pipes 27, 28 and 29 have a control valve 32 associated therewith for controlling the flow of water therethrough.

The amount of water allowed to pass through these valves 32 determines the speed of current of water passing down through the fish passageways 15, 16 and 17. The wider opened the valves 32 are adjusted the slower will be the current existing within the passageways 15, 16 and 17 and vice versa. The more closed the valves 32 are adjusted the faster the current will flow.

A screen 33 is provided in the upper ends of the passageways 15, 16 and 17 preventing fish from entering the pipes 27, 28 and 29, directing them through the fish passageways 15, 16 or 17 into the tanks 10, 11 and 12. Screens 33' are located below the valves 32 of the control pipes 27, 28 and 29 preventing fish from passing up through these pipes. A screen 34 is provided over the tops of the tanks 10, 11 and 12 for preventing the fish from escaping in the event of an overflow.

Valves 35 are provided in the upper ends of the fish passageways 15, 16 and 17 and have a supply water line attached thereto for filling the system with water for priming the same on putting the system into service.

Air bleeder valves 36 for bleeding air while filling the system with water are provided in the upper ends of the passageways 15, 16 and 17. In order to fill the system, the lower ends of the passageways 15, 16 and 17, and the lower ends of the supply tubes 23 and 25 are covered or closed off by a bodily removable closure cap 37, indicated by broken lines in Figure 3. The cap 37 is applied by and held in position by a jack 38, also shown by broken lines, and after the system is filled both the cap 37 and jack 38 are removed as will later be described, permitting the flow of water and fish through the system.

The mode of operation of this new and improved fish ladder L will now be described. In order to fill or prime the system, the valve 22 is closed. The closure caps 37 are then applied to the bottom ends of the passageways 15, 16 and 17 and supply pipes 23, 25 within the tanks 10, 11 and 12. The tanks 10, 11 and 12 are then filled with water to overflowing. The valves 32 of the flow control pipes 27, 28 and 29 are also closed.

Water lines are attached to the valves 35 and the air valves 36 are opened so that all passageways 15, 16 and 17 and flow control pipes 27, 28 and 29, together with supply pipes 20, 23 and 25 will be filled with water and all air expelled therefrom. After the system has been filled, the valves 35 and 36 are closed. After this is done the closure caps 37 are removed from under the passageways 15, 16 and 17 and supply pipes 23 and 25, and the valve 22 is opened. Valve 26' is then opened to permit flow through exist pipe 26.

When this is accomplished, water will enter through the supply water tube and fish passageway 20, down through the passageway 15, out into the tank 10, out of the tank 10 through thee supply tube 23, into the passageway 16, into the tank 11, out the supply line pipe 25, down through the passageway 17 and into the tank 12 and out through the fish passageway 26, into the river 14 without any air existing within this circuit, providing a siphon action.

After the siphon action controlling the flow of water down through the system has started, the speed of the flow of current of water down through the system is controlled by opening the valves 32 the desired amount, which by-passes the flow of water by way of the upper ends of the passageways 15, 16 and 17, causing a slowing down of the fall of water within the passageways 15, 16 and 17 by the suction action within the pipes 27, 28 and 29 caused by the fact that the lower ends of these pipes are at a much lower level than the bottoms of the corresponding vertical fish passageways, thereby slowing down the flow of current to the proper flow for the fish to be transferred either up or down.

One of the highlights of the invention is the controlling of the flow through the fish passage by the pipes 27, 28 and 29 and the valves 32. A series of tanks have been illustrated, as the drop from one tank to another is limited for the successful operation of the system. I do not wish to be limited to any number of tanks being used, this would depend upon the installation in question.

Having thus described the preferred embodiment of the invention, it should be understood that numerous structural modifications and adaptations may be resorted to without departing from the scope of the appended claims.

What is claimed is:

1. A fish ladder comprising a plurality of upright tubular fish passageways arranged in lateral and vertical offset relation adjacent an upper body of water, a conduit connecting the upper portion of the uppermost of said fish passageways to said body of water at a point in said body of water below the upper end portion of the uppermost of said fish passageways, an open top tank positioned beneath each of said fish passageways with the lower end of each of said fish passageways emersed in the water in a respective one of said tanks, a by-pass conduit extending from the upper end of the uppermost fish passageway to the tank of the next lower fish passageway, a by-pass conduit extending from the upper end of said next lower fish passageway to the tank of the lowermost fish passageway, a by-pass conduit extending from the upper end of said lowermost fish passageway to a lower body of water at a point spaced below the tank of said lowermost fish passageway, a fish passage conduit extending from the tank beneath the uppermost fish passageway to the upper end portion of the next lower fish passageway, a second fish passage conduit extending from the tank beneath the next lower fish passageway to the upper end portion of the lowermost fish passageway, a third fish passage conduit extending from the tank beneath said lowermost fish passageway to said lower body of water, and valve control means in each of said by-pass conduits for controlling the quantity of flow of by-pass fluid therethrough thus controlling the flow of fluid through said fish passageways.

2. A device as claimed in claim 1 wherein means are provided on each of said fish passageways for filling said fish ladder with water and eliminating air therefrom.

3. A device as claimed in claim 1 wherein a control valve is provided in the conduit connecting the uppermost of said fish passageways with an upper body of water to control the passage of water therethrough.

References Cited in the file of this patent

UNITED STATES PATENTS

| 336,327 | Laska | Feb. 16, 1886 |
| 2,068,363 | Westmore et al. | Jan. 19, 1937 |

FOREIGN PATENTS

| 37,583 | Germany | Nov. 17, 1886 |